(12) United States Patent
Kishihata

(10) Patent No.: US 11,110,676 B2
(45) Date of Patent: Sep. 7, 2021

(54) MANUFACTURING METHOD AND MANUFACTURING DEVICE FOR EXTRUDED RUBBER MEMBER

(71) Applicant: The Yokohama Rubber Co., LTD., Tokyo (JP)

(72) Inventor: Kazuaki Kishihata, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 449 days.

(21) Appl. No.: 15/565,045

(22) PCT Filed: Apr. 6, 2016

(86) PCT No.: PCT/JP2016/061264
§ 371 (c)(1),
(2) Date: Oct. 6, 2017

(87) PCT Pub. No.: WO2016/163399
PCT Pub. Date: Oct. 13, 2016

(65) Prior Publication Data
US 2018/0117866 A1    May 3, 2018

(30) Foreign Application Priority Data
Apr. 6, 2015 (JP) .............................. JP2015-077847

(51) Int. Cl.
*B29D 30/38* (2006.01)
*B29C 48/07* (2019.01)
(Continued)

(52) U.S. Cl.
CPC .............. *B29D 30/38* (2013.01); *B29C 48/07* (2019.02); *B29C 48/12* (2019.02); *B29C 48/154* (2019.02);
(Continued)

(58) Field of Classification Search
CPC .............. B29D 30/38; B29D 2030/722; B29D 2030/381; B29D 30/40; B29C 48/30;
(Continued)

(56) References Cited

U.S. PATENT DOCUMENTS 2,382,177 A * 8/1945 Schanz ................... B29C 48/30
425/131.1
2,539,690 A * 1/1951 Boorn ..................... B32B 27/00
156/178
(Continued)

FOREIGN PATENT DOCUMENTS

CN 101332651 12/2008
EP 1 241 026 9/2002
(Continued)

OTHER PUBLICATIONS

International Search Report for International Application No. PCT/JP2016/061264 dated Jul. 12, 2016, 4 pages, Japan.

*Primary Examiner* — Jeffrey M Wollschlager
(74) *Attorney, Agent, or Firm* — Thorpe North & Western

(57) ABSTRACT

Provided are a manufacturing method and a manufacturing device for an extruded rubber member. The manufacturing method for an extruded rubber member includes extruding at least one type of rubber from a die, the method including the steps of inserting at least one thread into a flow channel of the at least one type of rubber, and embedding the at least one thread in a longitudinal direction of the extruded rubber member.

10 Claims, 5 Drawing Sheets

(51) Int. Cl.

| | |
|---|---|
| *B29C 48/12* | (2019.01) |
| *B29C 48/154* | (2019.01) |
| *B29C 48/305* | (2019.01) |
| *B29C 48/345* | (2019.01) |
| *B29C 48/16* | (2019.01) |
| *B29C 48/156* | (2019.01) |
| *B29D 30/72* | (2006.01) |
| *B29K 19/00* | (2006.01) |

(52) U.S. Cl.

CPC ............ *B29C 48/156* (2019.02); *B29C 48/16* (2019.02); *B29C 48/305* (2019.02); *B29C 48/345* (2019.02); *B29D 2030/381* (2013.01); *B29D 2030/722* (2013.01); *B29K 2019/00* (2013.01)

(58) Field of Classification Search

CPC ....... B29C 70/20; B29C 48/156; B29C 70/06; B29C 48/15; B29C 48/154; B29C 48/16; B29C 48/345; B29C 48/305; B29C 48/18; B29C 48/21; B29K 2019/00

See application file for complete search history.

(56) References Cited

U.S. PATENT DOCUMENTS

| | | | | |
|---|---|---|---|---|
| 3,274,315 A * | 9/1966 | Yuzo | ....................... | B29C 48/11 264/563 |
| 4,439,387 A * | 3/1984 | Hawley | .................... | B29C 70/20 264/108 |
| 4,850,412 A * | 7/1989 | Gupta | ........................ | B60C 9/08 152/556 |
| 5,032,198 A * | 7/1991 | Kojima | .................. | B29D 30/08 152/531 |
| 5,114,633 A * | 5/1992 | Stewart | ................. | B29B 15/122 156/180 |
| 5,176,775 A * | 1/1993 | Montsinger | ........... | B29B 15/122 118/123 |
| 5,429,856 A * | 7/1995 | Krueger | ............ | A61F 13/51464 604/370 |
| 5,466,320 A * | 11/1995 | Burt | .................... | B29B 17/0042 156/244.17 |
| 5,779,961 A * | 7/1998 | Teutsch | ............... | B29C 48/2886 264/176.1 |
| 5,879,602 A * | 3/1999 | Scheuring | ............. | B29B 15/122 264/136 |
| 6,729,867 B2 * | 5/2004 | Peter | ........................ | B29C 41/36 425/132 |
| 6,863,729 B2 * | 3/2005 | McCullough | ........... | B29C 48/30 118/125 |
| 6,899,782 B1 * | 5/2005 | Chang | ...................... | B29C 48/08 156/244.11 |
| 7,163,388 B2 * | 1/2007 | Anand | .................... | B29C 48/304 425/131.1 |
| 7,316,840 B2 * | 1/2008 | Neculescu | ........ | A61F 13/15593 2/400 |
| 7,993,558 B2 * | 8/2011 | Nicolas | .................... | B29C 48/30 264/171.13 |
| 7,993,568 B2 * | 8/2011 | Heffner | .................. | H01B 13/14 264/505 |
| 8,017,053 B2 * | 9/2011 | De Rijcke | .............. | B29C 48/131 264/209.8 |
| 9,821,524 B2 * | 11/2017 | Denavit | ................... | B29C 43/24 |
| 2001/0045254 A1 | 11/2001 | Senbokuya et al. | | |
| 2002/0084016 A1 * | 7/2002 | Tanaka | .................... | B29D 30/60 156/121 |
| 2002/0157747 A1 * | 10/2002 | Shimada | ................. | B29D 30/52 152/209.5 |
| 2006/0157177 A1 | 7/2006 | Shimada et al. | | |
| 2007/0122605 A1 | 5/2007 | Downing | | |
| 2007/0149076 A1 * | 6/2007 | Van Moeseke | ........... | B32B 5/12 442/134 |
| 2007/0277896 A1 * | 12/2007 | Takagi | ................... | F16L 11/081 138/137 |
| 2008/0295953 A1 | 12/2008 | Nicolas | | |
| 2010/0136332 A1 * | 6/2010 | Murayama | ........... | D06M 15/233 428/367 |
| 2011/0308454 A1 | 12/2011 | Nicolas | | |
| 2012/0000590 A1 * | 1/2012 | Cogne | ................... | B60C 9/0007 152/564 |
| 2012/0013223 A1 * | 1/2012 | Hsu | ..................... | H01L 41/1134 310/339 |
| 2014/0190617 A1 * | 7/2014 | Adachi | .................. | B29D 30/36 156/117 |
| 2014/0271754 A1 * | 9/2014 | Blaney | ..................... | B32B 27/30 424/402 |
| 2014/0328963 A1 * | 11/2014 | Mark | ..................... | B29C 64/106 425/143 |
| 2015/0285334 A1 * | 10/2015 | Thomas | ..................... | F16G 1/10 474/90 |
| 2017/0331027 A1 * | 11/2017 | Kim | ..................... | H01L 41/193 |

FOREIGN PATENT DOCUMENTS

| | | |
|---|---|---|
| EP | 1 997 607 | 12/2008 |
| JP | 2001-287257 | 10/2001 |
| JP | 2004-025597 | 1/2004 |
| JP | 2006-347093 | 12/2006 |
| JP | 2010274812 | * 12/2010 |
| JP | 2012-091658 | 5/2012 |
| JP | 2012-131031 | 7/2012 |
| JP | 2013-049382 | 3/2013 |
| WO | WO 2012/070265 | 5/2012 |
| WO | WO 2013/035555 | 3/2013 |

* cited by examiner

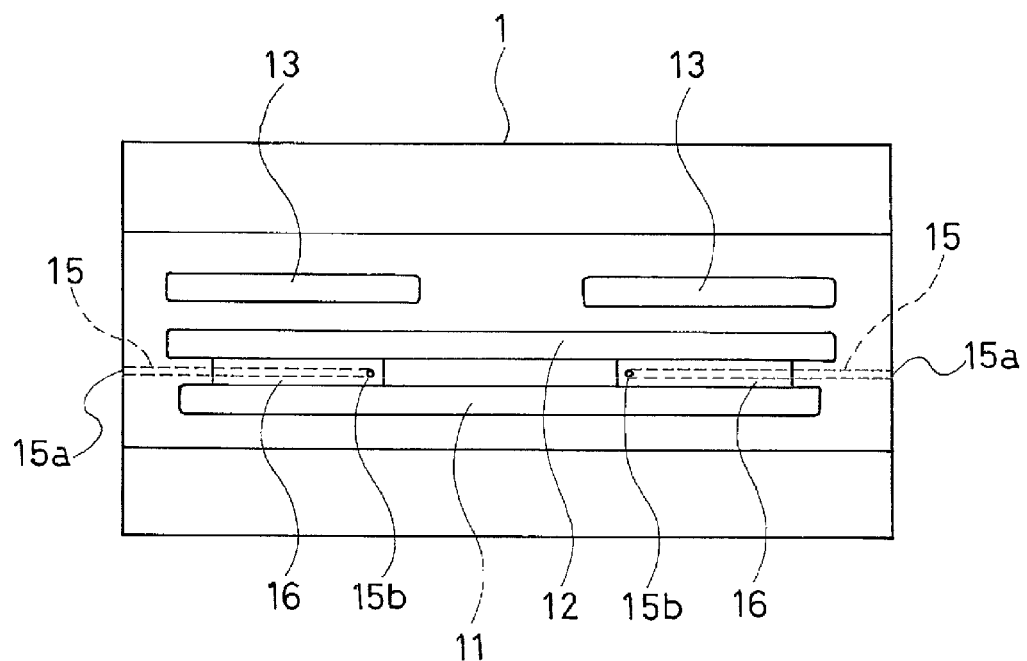
FIG. 4
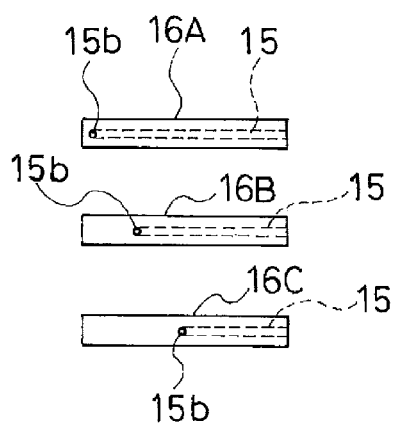
FIG. 5A
FIG. 5B
FIG. 5C

MANUFACTURING METHOD AND MANUFACTURING DEVICE FOR EXTRUDED RUBBER MEMBER

TECHNICAL FIELD

The present technology relates to a manufacturing method and a manufacturing device for an extruded rubber member used in a pneumatic tire, and particularly to a manufacturing method and a manufacturing device for an extruded rubber member capable of enhancing air dispersion during vulcanization at an interface of rubber layers, and effectively suppressing blister defects.

BACKGROUND ART

When a pneumatic tire is vulcanized, vulcanization defects called blisters may occur. Blister defects are defects in which the water content and enclosed air contained in the rubber as well as the air enclosed in steps formed at end portions of the tire components during tire molding are locally collected during vulcanization, producing air bubbles. These air bubbles, when not dispersed during vulcanization, turn into blisters, remaining inside the tire. While the water content and the enclosed air contained in the rubber produce a countless number of air bubbles in the initial vulcanization period, a significant portion of the air bubbles are micro-dispersed during vulcanization and destroyed. Nevertheless, during micro-dispersion, the air bubbles concentrate in areas where the pressurizing force is weak, and may reoccur after vulcanization, forming blisters.

To suppress such blister defects, the tire components are pressed by a stitcher during tire molding to promote air dispersion, and the air is discharged during vulcanization through vent holes disposed on a mold inner surface. This alone, however, does not sufficiently remove the air enclosed in the tire interior.

In response, on the basis of the discovery that air pockets readily form between a carcass layer and adjacent members, proposals have been made to prevent the formation of air pockets during vulcanization by arranging air absorptive organic fiber cords not covered by rubber on at least one surface of the carcass layer, and absorbing the air enclosed between the carcass layer and adjacent members using the organic fiber cords (refer to International Patent Application Publication No. WO 2013/035555, for example).

Nevertheless, while the air enclosed between the carcass layer and the adjacent members can be absorbed when air absorptive organic fiber cords not covered by rubber are disposed on at least one surface of the carcass layer as described above, effective suppression of the blister defects cannot always be achieved. Further, when the air absorptive organic fiber cords not covered by rubber are disposed on the surface of the carcass layer, the organic fiber cords may separate or relatively change in position in the tire molding step.

SUMMARY

The present technology provides a manufacturing method and a manufacturing device for an extruded rubber member capable of enhancing air dispersion during vulcanization at an interface of rubber layers, and effectively suppressing blister defects.

A manufacturing method for an extruded rubber member according to an aspect of the present technology for achieving the above-described object includes extruding at least one type of rubber from a die. This method includes the steps of inserting at least one thread into a flow channel of the at least one type of rubber, and embedding the at least one thread in a longitudinal direction of the extruded rubber member.

Further, the manufacturing method for an extruded rubber member according to an aspect of the present technology for achieving the above-described object includes extruding at least two types of rubber from the die. This method includes the steps of inserting at least one thread into flow channels of the at least two types of rubber, and embedding the at least one thread in a longitudinal direction of the extruded rubber member while disposing the at least one thread at an interface of at least two types of rubber layers made from the at least two types of rubber.

On the other hand, a manufacturing device for an extruded rubber member according to an aspect of the present technology for achieving the above-described object is a device that includes a preform die configured to supply at least one type of rubber, and a die configured to regulate an extruded shape of an extruded rubber member made from the at least one type of rubber. The preform die is provided with a thread supply path configured to supply at least one thread into a flow channel of the at least one type of rubber.

Further, the manufacturing device for an extruded rubber member according to an aspect of the present technology for achieving the above-described object is a device that includes the preform die configured to supply at least two types of rubber, and the die configured to regulate an extruded shape of an extruded rubber member made from the at least two types of rubbers. The preform die is provided with a thread supply path configured to supply at least one thread into flow channels of the at least two types of rubber, and the thread supply path includes a discharge port disposed between the flow channels of the at least two types of rubber.

As a result of diligent research on blister defects that occur during vulcanization, the present inventors have discovered that, in a pneumatic tire using an extruded rubber member, blister defects readily occur at an interface of rubber layers constituting the extruded rubber member, and these findings have led to the present technology.

That is, according to the present technology, when at least one type of rubber is extruded from a die to manufacture an extruded rubber member, at least one thread is inserted into the flow channel of the rubber and the thread is embedded in the longitudinal direction of the extruded rubber member. In particular, when at least two types of rubber are extruded from the die to manufacture an extruded rubber member, at least one thread is inserted into the flow channels of the rubber and the thread is embedded in the longitudinal direction of the extruded rubber member while disposing the thread at an interface of at least two types of rubber layers. This enhances the air dispersion during vulcanization at the interface of the rubber layers, making it possible to effectively suppress blister defects. Moreover, when the thread is embedded in the extruded rubber member, the thread never separates or changes relatively in position in the tire molding step, resulting in the advantage that the tire molding step can be smoothly executed.

In the present technology, a breaking strength of the thread is preferably 100 N or less. This thread is designed to enhance air dispersion, and does not serve as a reinforcing member. Regulating the upper limit value of the breaking strength, therefore, makes it possible to suppress the effect on the behavior of the extruded rubber member in the tire molding step to a minimum.

Preferably, the extruded rubber member includes a cap tread rubber layer and an undertread rubber layer, and the thread is disposed at the interface between the cap tread rubber layer and the undertread rubber layer. As a result, the air that collects at the interface between the cap tread rubber layer and the undertread rubber layer during vulcanization can be dispersed by the thread.

Preferably, the extruded rubber member includes a tread rubber layer and an edge rubber layer, and the thread is disposed at the interface between the tread rubber layer and the edge rubber layer. As a result, the air that collects at the interface between the tread rubber layer and the edge rubber layer during vulcanization can be dispersed by the thread.

Preferably, the extruded rubber member includes a side rubber layer and a rim cushion rubber layer, and the thread is disposed at the interface between the side rubber layer and the rim cushion rubber layer. As a result, the air that collects at the interface between the side rubber layer and the rim cushion rubber layer during vulcanization can be dispersed by the thread.

BRIEF DESCRIPTION OF DRAWINGS

FIG. 4 is a front view illustrating a modified example of the preform die.

FIGS. 5A, 5B, and 5C illustrate various spacers mounted on the preform die in FIG. 4, each being a front view of the spacer.

DETAILED DESCRIPTION

Figure 1:
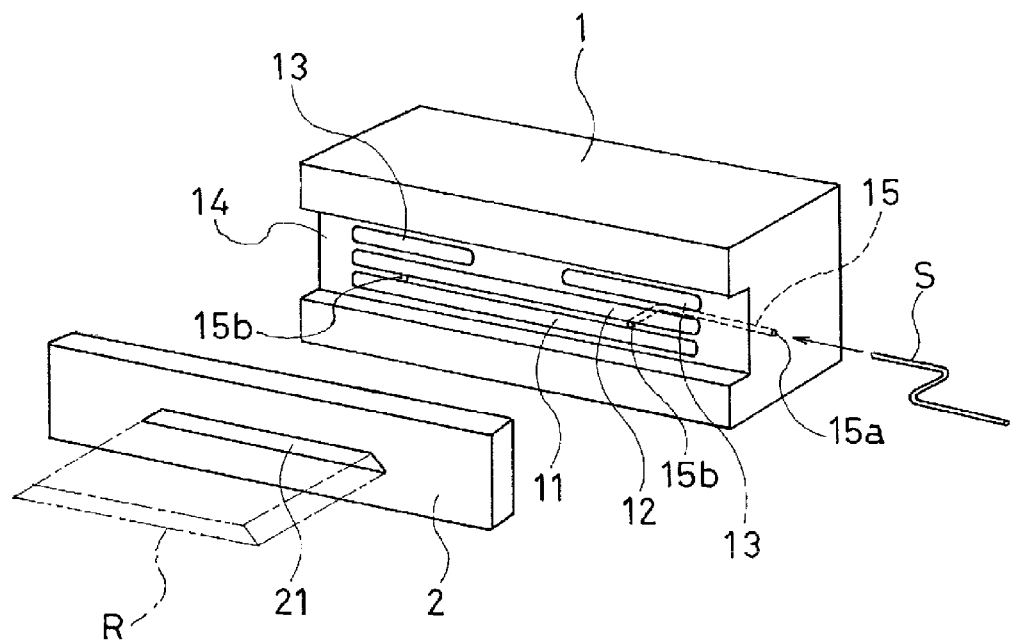
FIG. 1 is a perspective view illustrating a manufacturing device for an extruded rubber member according to an embodiment of the present technology.
Figure 2:
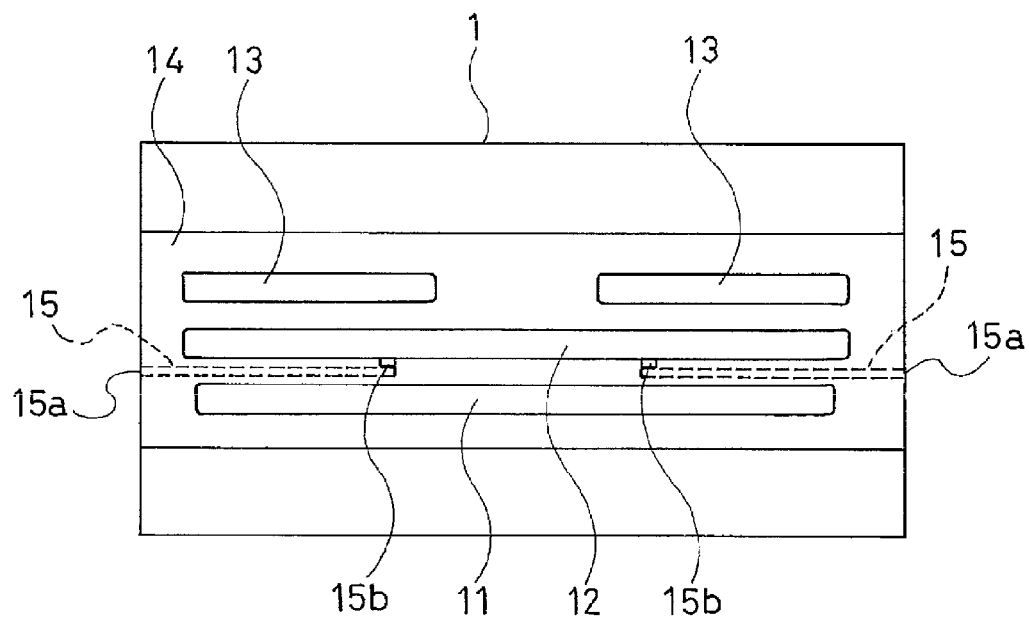
FIG. 2 is a front view illustrating a preform die constituting the manufacturing device for an extruded rubber member in FIG. 1.

A configuration of the present technology is described below in detail with reference to the accompanying drawings. FIGS. 1 to 3C illustrate a manufacturing device for an extruded rubber member according to an embodiment of the present technology. As illustrated in FIGS. 1 and 2, the manufacturing device for an extruded rubber member of the present embodiment includes a preform die 1 that supplies a plurality of types of rubber, and a die 2 mounted on a front portion of the preform die 1.

The preform die 1 includes flow channels 11 to 13 that individually guide a plurality of types of rubber supplied from a plurality of cylinders (not illustrated) disposed on the rearward side. Here, the flow channel 11 guides an undertread rubber Ru for molding an undertread rubber layer, the flow channel 12 guides a cap tread rubber Rc for molding a cap tread rubber layer, and the flow channel 13 guides an edge rubber Re for molding an edge rubber layer. The undertread rubber layer and the cap tread rubber layer are layered to form a tread rubber layer, and the edge rubber layer is integrally molded with both end portions in a width direction of the tread rubber layer. Further, a recessed portion 14 on which the die 2 is mounted is formed on the front portion of the preform die 1.

Figure 3A:
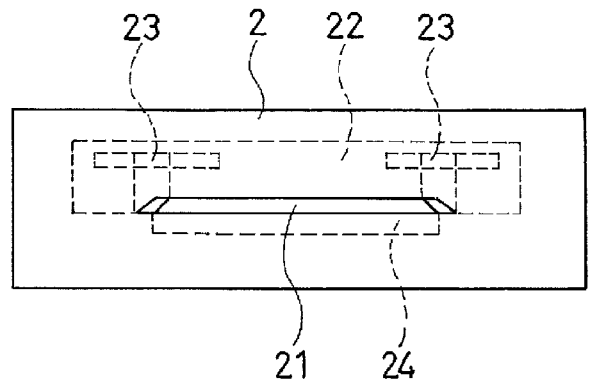
FIGS. 3A, 3B, and 3C illustrate the die constituting the manufacturing device for an extruded rubber member in FIG. 1, FIG. 3A being a front view, FIG. 3B being a rear view, and FIG. 3C being a cross-sectional view taken along arrow X-X.
Figure 3B:
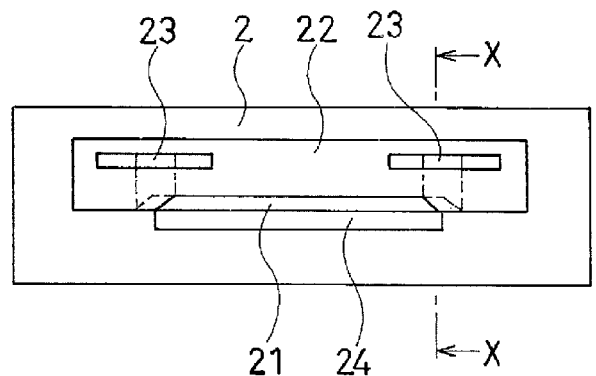
Figure 3C:
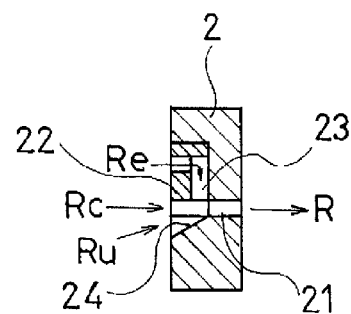

The die 2 includes an extrusion port 21 that regulates the extruded shape of an extruded rubber member R comprising the plurality of types of rubber Ru, Rc, and Re. The extrusion port 21 is disposed in a position corresponding to the flow channel 12 of the preform die 1 that supplies the cap tread rubber Rc. As illustrated in FIGS. 3A to 3C, a rectifier 22 is mounted on a back surface side of the die 2. This rectifier 22 includes a guide path 23 that introduces the edge rubber Re supplied from the flow channel 13 of the preform die 1 to both end portions in the width direction of the extrusion port 21 while squeezing the edge rubber Re. Further, an inclined surface 24 is formed in an area adjacent to a lower side of the extrusion port 21 on the back surface side of the die 2. With such an inclined surface 24 provided, the undertread rubber Ru supplied from the flow channel 11 of the preform die 1 is guided to the extrusion port 21.

In the above-described manufacturing device for an extruded rubber member, a thread supply path 15 that supplies at least one thread S to the flow channels of the rubber Ru, Rc is formed in the preform die 1. An inlet 15a of the thread supply path 15 is disposed on a side surface of the preform die 1, and a discharge port 15b of the thread supply path 15 is disposed between the flow channel 11 that guides the undertread rubber Ru and the flow channel 12 that guides the cap tread rubber Rc. The thread S is discharged between the flow channels of the rubber Ru, Rc via the thread supply path 15, and automatically fed out with the extrusion of the rubber Ru, Rc.

FIGS. 4 and 5A to 5C illustrate a modified example of the preform die. In FIG. 4, a removable spacer 16 is mounted on an area that includes at least a portion of the thread supply path 15 and the discharge port 15b of the preform die 1. As illustrated in FIGS. 5A to 5C, a plurality of types of spacers 16A, 16B, 16C each including the discharge port 15b of the thread supply path 15, each of the discharge ports 15b being disposed at a different position, are provided and suitably replaced, making it possible to change the insertion position of the thread S of the preform die 1.

When the extruded rubber member R is manufactured using the above-described device, the undertread rubber Ru, the cap tread rubber Rc, and the edge rubber Re are simultaneously supplied from the preform die 1 and integrally extruded from the die 2 so as to continuously manufacture the extruded rubber member R. At this time, at least one thread S is inserted into the flow channels of the rubber Ru, Rc, making it possible to embed the thread S in the longitudinal direction of the extruded rubber member R while disposing the thread S at an interface between the undertread rubber layer made from the rubber Ru and the cap tread rubber layer made from the rubber Rc.

According to the manufacturing method for an extruded rubber member described above, at least one thread S is inserted into a flow channel of the rubber Ru, Rc, and this thread S is embedded in the longitudinal direction of the extruded rubber member R while disposed at the interface of the plurality of rubber layers, thereby enhancing air dispersion during vulcanization at the interface of the rubber layers, making it possible to effectively suppress blister defects. Moreover, when the thread S is embedded in the extruded rubber member R, the thread never separates or changes relatively in position in the tire molding step, resulting in the advantage that the tire molding step can be smoothly executed.

A breaking strength of the thread S is preferably 100 N or less, and more preferably from 1 N to 5 N. This thread S is designed to enhance air dispersion, and does not serve as a reinforcing member. Regulating the upper limit value of the breaking strength, therefore, makes it possible to suppress the effect on the behavior of the extruded rubber member R in the tire molding step to a minimum. When the breaking strength of the thread S is too large, the tire molding step may be adversely affected.

Examples of the constituent materials of the thread S, while not particularly limited to a specific material, include synthetic fibers such as nylon, polyester, and rayon, as well as natural fibers such as cotton. Further, a total linear density of the thread S is preferably within a range of from 25 dtex to 170 dtex. This makes it possible to ensure a reduced breaking strength as well as favorable air dispersion.

A cord density of the thread S is preferably 5 strands per 50 mm or less. This thread S is designed to enhance air dispersion, and does not serve as a reinforcing member. Regulating the upper limit value of the cord density, therefore, makes it possible to suppress the effect on the behavior of the extruded rubber member R in the tire molding step to a minimum. When the cord density of the thread S is too large, the tire molding step may be adversely affected. Note that the cord density of the thread S is identified from the spacing between the threads S. For example, when the spacing between the threads S is P mm, the cord density (strands per 50 mm) of the thread S is 50/P. Further, when the cord count of the thread S at each interface is 1, the cord density is regarded as 5 strands per 50 mm or less.

Figure 6:
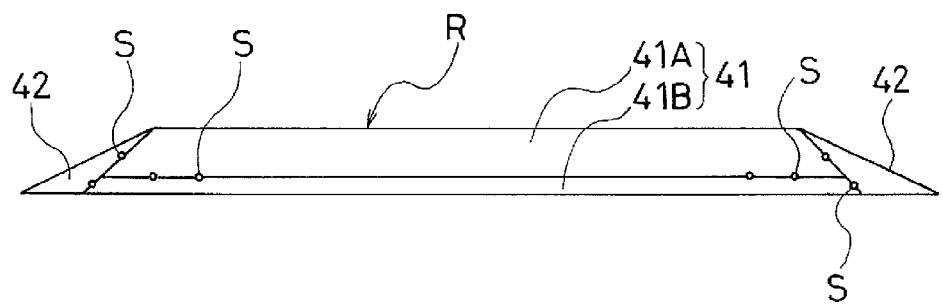
FIG. 6 is a cross-sectional view illustrating an example of the extruded rubber member achieved by the present technology.

FIG. 6 illustrates an example of the extruded rubber member achieved by the present technology. In FIG. 6, the extruded rubber member R includes a tread rubber layer 41, and an edge rubber layer 42 disposed on both end portions in the width direction of the tread rubber layer 41. The tread rubber layer 41 includes a cap tread rubber layer 41A and an undertread rubber layer 41B. In this extruded rubber member R, a plurality of the threads S extending in the longitudinal direction of the extruded rubber member R are disposed at the interface between the cap tread rubber layer 41A and the undertread rubber layer 41B. Further, in this extruded rubber member R, a plurality of the threads S extending in the longitudinal direction of the extruded rubber member R are disposed at the interface between the tread rubber layer 41 and the edge rubber layer 42. In this way, the insertion position of the threads S of the extruded rubber member R may be selected as desired.

Figure 7:
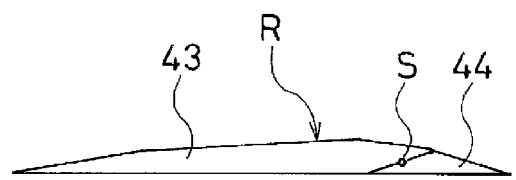
FIG. 7 is a cross-sectional view illustrating another extruded rubber member achieved by the present technology.

FIG. 7 illustrates another extruded rubber member achieved by the present technology. In FIG. 7, the extruded rubber member R includes a side rubber layer 43 and a rim cushion rubber layer 44. In this extruded rubber member R, one thread S extending in the longitudinal direction of the extruded rubber member R is disposed at the interface between the side rubber layer 43 and the rim cushion rubber layer 44. The extruded shape of the extruded rubber member R may be selected as desired, and the tire components to be applied may also be selected as desired.

Figure 8:
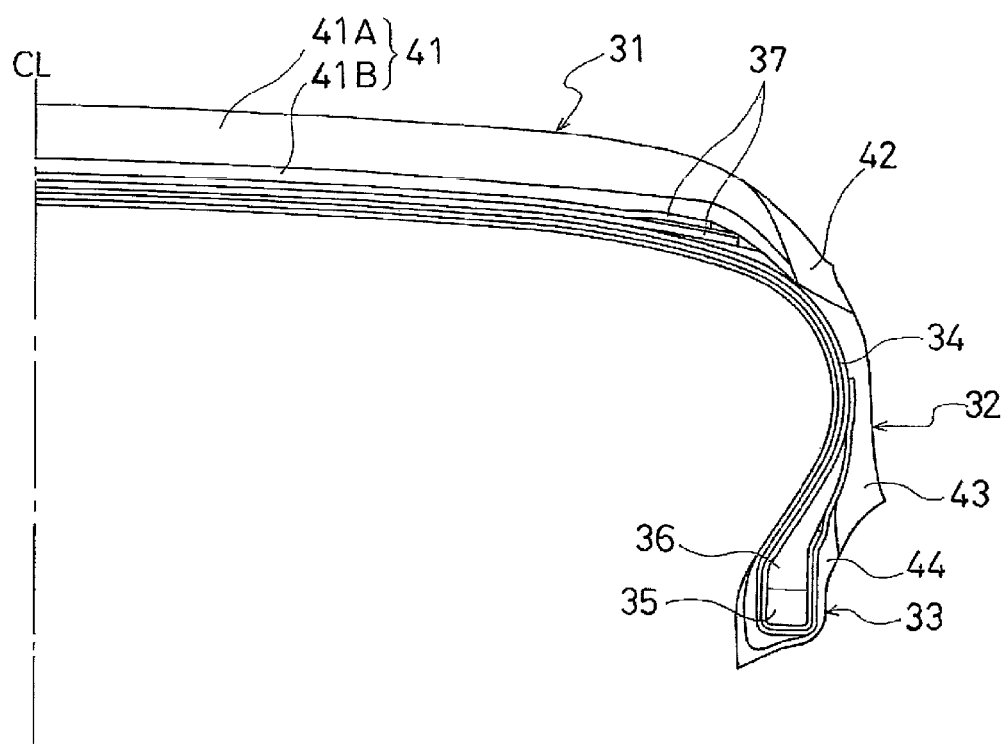
FIG. 8 is a half cross-sectional view taken along a meridian illustrating an example of a pneumatic tire achieved by the present technology.

FIG. 8 illustrates one example of a pneumatic tire achieved by the present technology. Note that, while FIG. 8 illustrates only a portion on one side of a tire center line CL, this pneumatic tire has a corresponding structure on the other side of the tire center line CL as well.

In FIG. 8, 31 is a tread portion, 32 is a sidewall portion, and 33 is a bead portion. Two carcass layers 34 that include a plurality of reinforcing cords extending in a tire radial direction are disposed extending between a pair of left and right bead portions 33, 33. End portions of the carcass layers 34 are folded around bead cores 35 from a tire inner side to a tire outer side. A bead filler 36 formed from a rubber composition having a high degree of hardness is disposed on peripheries of the bead cores 35, and the bead filler 36 is encompassed by the carcass layers 34.

A plurality belt layers 37 are embedded on an outer circumferential side of the carcass layers 34 in the tread portion 31. These belt layers 37 include a plurality of reinforcing cords that are inclined with respect to the tire circumferential direction, and the direction of the reinforcing cords of the different layers intersect each other.

Furthermore, the tread rubber layer 41 is disposed on an outer circumferential side of the belt layers 37 in the tread portion 31. This tread rubber layer 41 includes the cap tread rubber layer 41A exposed to the tire outer surface, and the undertread rubber layer 41B positioned on the inner side in the tire radial direction of the cap tread rubber layer 41A. The edge rubber layer 42 is disposed on both outer sides of the tread rubber layer 41 in the tire lateral direction. Further, the side rubber layer 43 is disposed on the outer side in the tire lateral direction of the carcass layer 34 of the sidewall portion 32, and the rim cushion rubber layer 44 adjacent to the side rubber layer 43 is disposed on the bead portion 33.

In the manufacture of the pneumatic tire described above, the cap tread rubber layer 41A, the undertread rubber layer 41B, and the edge rubber layer 42 are integrally molded by extrusion, and subsequently supplied to the tire molding step as an integrated tire component (refer to FIG. 6). Further, the side rubber layer 43 and the rim cushion rubber layer 14 are integrally molded by extrusion, and subsequently supplied to the tire molding step as an integrated tire component (refer to FIG. 7). In the extruded rubber member R, at least one thread S is embedded in the interface so as to extend in the tire circumferential direction.

When the pneumatic tire thus configured is vulcanized, the unvulcanized tire molded through the tire molding step is inserted into a mold and heated while applying pressure from the tire inner side by a bladder. At this time, the water content and air enclosed in the tire interior in the initial period of vulcanization produce air bubbles, many of which are micro-dispersed and destroyed during vulcanization. Nevertheless, the air bubbles locally concentrate in areas where the pressurizing force is weak during micro-dispersion. In response, at least one thread S is disposed at the interface of the rubber layers of the extruded rubber member R, thereby enhancing air dispersion during vulcanization at the interface and making it possible to effectively suppress blister defects.

In particular, with the thread S disposed at the interface between the cap tread rubber layer 41A and the undertread rubber layer 41B, the air that collects at the interface between the cap tread rubber layer 41A and the undertread rubber layer 41B during vulcanization can be dispersed by the thread S. Further, with the thread S disposed at the interface between the tread rubber layer 41 and the edge rubber layer 42, the air that collects at the interface between the tread rubber layer 41 and the edge rubber layer 42 during vulcanization can be dispersed by the thread S. Furthermore, with the thread S disposed at the interface between the side rubber layer 43 and the rim cushion rubber layer 44, the air that collects at the interface between the side rubber layer 43 and the rim cushion rubber layer 44 during vulcanization can be dispersed by the thread S.

While at least two types of rubber are extruded from the die to manufacture the extruded rubber member in the embodiment described above, the present technology can also be applied to cases where, in the manufacture of an extruded rubber member by extrusion of a single type of rubber from a die, at least one thread is inserted into the flow channel of the rubber and embedded in the longitudinal direction of the extruded rubber member. In this case as well, air dispersion during vulcanization at the interface of the extruded rubber member can be enhanced.

EXAMPLES

In the manufacture of a pneumatic tire having a tire size of 225/65R17, an extruded rubber member including a cap tread rubber layer, an undertread rubber layer and an edge rubber layer, and an extruded rubber member including a side rubber layer and a rim cushion rubber layer were each molded using a device such as illustrated in FIGS. 1 to 3C. Two threads were embedded at the interface between the cap tread rubber layer and the undertread rubber layer, two threads were embedded at the interface of the tread rubber layer and the edge rubber layer, and one thread was embedded between the side rubber layer and the rim cushion rubber layer. The pneumatic tire was then manufactured using these extruded rubber members including these threads. (Example 1). The thread used was made from cotton fiber and had a total linear density of 29.5 dtex. The breaking strength of the thread was 1 N. In addition, a pneumatic tire was manufactured using the same method as that of Example 1, except that the threads were not disposed at the interfaces of the rubber layers described above. (Conventional Example 1)

Ninety-six pneumatic tires were vulcanized for each of the manufacturing methods of Example 1 and Conventional Example 1. After vulcanization, the pneumatic tires were inspected for blister defects, and the blister defect occurrence rate was found. As a result, in the tires of Example 1, the occurrence of blister defects showed a decrease in each area of the shoulder portion and the rim cushion portion in comparison to that of the Conventional Example 1. Thus, the blister defect occurrence rate of Example 1 was approximately 14% of the blister defect occurrence rate of Conventional Example 1.

The invention claimed is:

1. A manufacturing method for an extruded rubber member comprising extruding at least one type of rubber from a die, the method comprising the steps of:
    feeding at least one thread through a preform die, the at least one thread being formed from at least one thread material selected from nylon, polyester, rayon or cotton, each of the at least one thread being fed individually and independently of any other of the at least one thread through a thread supply path configured for a single thread of the at least one thread, the thread supply path having a thread inlet and thread discharge port oriented in different directions relative to one another;
    inserting the at least one thread into a flow channel of the at least one type of rubber; and
    embedding the at least one thread in a longitudinal direction of the extruded rubber member.

2. The manufacturing method for an extruded rubber member according to claim 1, wherein the method comprises extruding at least two types of rubber from the die, the method comprising the steps of:
    inserting the at least one thread into flow channels of the at least two types of rubber; and
    embedding the at least one thread in a longitudinal direction of the extruded rubber member while disposing the at least one thread at an interface of at least two types of rubber layers made from the at least two types of rubber.

3. The manufacturing method for an extruded rubber member according to claim 1, wherein a breaking strength of the at least one thread is 100 N or less.

4. The manufacturing method for an extruded rubber member according to claim 1, wherein:
    the extruded rubber member comprises a cap tread rubber layer and an undertread rubber layer; and
    the at least one thread is disposed at an interface between the cap tread rubber layer and the undertread rubber layer.

5. The manufacturing method for an extruded rubber member according to claim 1, wherein:
    the extruded rubber member comprises a tread rubber layer and an edge rubber layer; and
    the at least one thread is disposed at an interface between the tread rubber layer and the edge rubber layer.

6. The manufacturing method for an extruded rubber member according to claim 1, wherein:
    the extruded rubber member comprises a side rubber layer and a rim cushion rubber layer; and
    the at least one thread is disposed at an interface between the side rubber layer and the rim cushion rubber layer.

7. The manufacturing method for an extruded rubber member according to claim 2, wherein a breaking strength of the at least one thread is 100 N or less.

8. The manufacturing method for an extruded rubber member according to claim 2, wherein:
    the extruded rubber member comprises a cap tread rubber layer and an undertread rubber layer; and
    the at least one thread is disposed at an interface between the cap tread rubber layer and the undertread rubber layer.

9. The manufacturing method for an extruded rubber member according to claim 2, wherein:
    the extruded rubber member comprises a tread rubber layer and an edge rubber layer; and
    the at least one thread is disposed at an interface between the tread rubber layer and the edge rubber layer.

10. The manufacturing method for an extruded rubber member according to claim 2, wherein:
    the extruded rubber member comprises a side rubber layer and a rim cushion rubber layer; and
    the at least one thread is disposed at an interface between the side rubber layer and the rim cushion rubber layer.

* * * * *